United States Patent
Devlin et al.

(10) Patent No.: US 11,003,463 B2
(45) Date of Patent: May 11, 2021

(54) VIRTUAL DESKTOP

(71) Applicant: Rocket Software, Inc., Waltham, MA (US)

(72) Inventors: Joseph Devlin, Westford, MA (US); Robert Penny, Brookline, MA (US)

(73) Assignee: Rocket Software, Inc., Waltham, MA (US)

( * ) Notice: Subject to any disclaimer, the term of this patent is extended or adjusted under 35 U.S.C. 154(b) by 0 days.

(21) Appl. No.: 15/706,677

(22) Filed: Sep. 16, 2017

(65) Prior Publication Data

US 2018/0084087 A1    Mar. 22, 2018

Related U.S. Application Data

(60) Provisional application No. 62/395,555, filed on Sep. 16, 2016.

(51) Int. Cl.
| | |
|---|---|
| *G06F 15/16* | (2006.01) |
| *G06F 9/445* | (2018.01) |
| *H04L 29/06* | (2006.01) |
| *H04L 29/08* | (2006.01) |
| *G06F 8/61* | (2018.01) |
| *G06F 9/451* | (2018.01) |
| *H04W 12/06* | (2021.01) |
| *G06F 3/0481* | (2013.01) |

(52) U.S. Cl.
CPC ............ *G06F 9/44526* (2013.01); *G06F 8/61* (2013.01); *G06F 9/452* (2018.02); *H04L 67/02* (2013.01); *H04L 67/2838* (2013.01); *H04L 67/42* (2013.01); *H04W 12/068* (2021.01); *G06F 3/04817* (2013.01); *H04L 63/0815* (2013.01)

(58) Field of Classification Search
CPC ..... H04L 67/42; H04L 67/02; H04L 67/2838; H04L 63/0815; G06F 9/4445; G06F 9/44526; G06F 9/452; G06F 3/04817; H04W 12/06
USPC .......................................................... 709/203
See application file for complete search history.

(56) References Cited

U.S. PATENT DOCUMENTS

| | | | |
|---|---|---|---|
| 6,073,163 A | 6/2000 | Clark et al. | |
| 6,604,241 B1* | 8/2003 | Haeri | H04L 29/12066 348/E7.071 |
| 6,944,644 B2 | 9/2005 | Gideon | |
| 8,789,040 B1* | 7/2014 | Callary | G06F 8/61 700/94 |
| 2002/0165993 A1 | 11/2002 | Kramer | |
| 2007/0260702 A1* | 11/2007 | Richardson | G06F 9/45558 709/217 |
| 2008/0307043 A1 | 12/2008 | Dorsey et al. | |
| 2010/0281107 A1* | 11/2010 | Fallows | G06F 9/54 709/203 |
| 2011/0209064 A1* | 8/2011 | Jorgensen | G06F 9/54 715/733 |

(Continued)

*Primary Examiner* — Atta Khan
(74) *Attorney, Agent, or Firm* — Danielson Legal LLC

(57) ABSTRACT

Methods and systems for presenting a virtual desktop. In some embodiments, the system includes a client computer comprising one or more client-side plugins; and a server computer comprising a web server that incorporates one or more server-side plugins. Each plugin may be associated with a plugin definition and the plugin definition associated with the server-side plugin is configured to be imported by the client computer.

17 Claims, 6 Drawing Sheets

(56) References Cited

U.S. PATENT DOCUMENTS

| | | | | |
|---|---|---|---|---|
| 2012/0124124 A1* | 5/2012 | Beaty | ............ | G06F 9/45533 |
| | | | | 709/203 |
| 2012/0151372 A1* | 6/2012 | Kominac | ............ | H04L 67/42 |
| | | | | 715/740 |
| 2012/0226998 A1* | 9/2012 | Friedl | ............ | H04L 65/1069 |
| | | | | 715/760 |
| 2013/0007115 A1* | 1/2013 | King | ............ | G06F 3/0481 |
| | | | | 709/203 |
| 2013/0151598 A1* | 6/2013 | Fu | ............ | H04L 67/42 |
| | | | | 709/203 |
| 2013/0290856 A1* | 10/2013 | Beveridge | ............ | G06F 9/452 |
| | | | | 715/740 |
| 2014/0089395 A1* | 3/2014 | Atsatt | ............ | H04L 67/38 |
| | | | | 709/203 |
| 2014/0344332 A1* | 11/2014 | Giebler | ............ | H04L 67/42 |
| | | | | 709/203 |
| 2015/0135198 A1* | 5/2015 | Pack, III | ............ | G06F 9/542 |
| | | | | 719/318 |
| 2016/0072788 A1* | 3/2016 | Chhabra | ............ | G06F 21/31 |
| | | | | 726/7 |
| 2016/0100015 A1* | 4/2016 | Levy | ............ | H04L 67/141 |
| | | | | 709/227 |
| 2016/0119399 A1* | 4/2016 | Glass | ............ | G06F 9/45529 |
| | | | | 709/219 |
| 2016/0277470 A1* | 9/2016 | Kruglikov | ............ | H04L 65/607 |
| 2017/0339250 A1* | 11/2017 | Momchilov | ............ | H04W 12/0609 |
| 2017/0339563 A1* | 11/2017 | Singleton, IV | ............ | H04W 12/08 |
| 2018/0217885 A1* | 8/2018 | Steuer | ............ | G06F 9/547 |

* cited by examiner

VIRTUAL DESKTOP

CROSS REFERENCE TO RELATED APPLICATIONS

The present application claims the benefit of U.S. provisional application No. 62/395,555, filed on Sep. 16, 2016, the entire disclosure of which is incorporated by reference as if set forth in its entirety herein.

TECHNICAL FIELD

Embodiments described herein generally relate to methods and devices for presenting virtual desktops, and more specifically to methods and systems to facilitate the installation of third party applications to virtual desktop systems.

BACKGROUND

Many mainframe and legacy computing systems have operating systems that were not designed to facilitate user interactions. Most UNIX®-based systems natively support user interaction through text-based terminals, and graphical user interfaces (GUIs) are often available for these types of systems as add-on features. For example, the windowing system known as X is often installed on UNIX®-based systems to permit users of a client computer running an X-server GUI to operate a legacy server running an X-client.

These systems operate by transmitting windowing primitives from X-client to X-server for execution by the X-server, and transmitting keystrokes, mouse operations, or other types of inputs in return to the X-client. While other remote windowing systems exist (RDP, ICA, VNC, etc.) they rely on the server's operating system to include GUI functionality.

Although X permits the development of GUI applications for operating systems that lack native GUI functionality, X requires that each application be written against the various X APIs to implement this functionality. This can be difficult and impractical when, for example, converting a legacy application to a graphical environment.

Traditional GUI operating systems (MICROSOFT WINDOWS®, OS X®, etc.) depend on graphics primitives being evaluated on the server system, even in the case of remote desktops. This is acceptable for systems that are not traditionally considered multiuser (e.g., MICROSOFT WINDOWS® and OS X®), but does not scale well when a large number of users wish to have a "desktop experience" with the same system at the same time.

A need exists, therefore, for virtual desktop systems and methods that overcome the above disadvantages.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a virtual desktop system. The system includes a client computer comprising one or more client-side plugins; and a server computer comprising a web server that incorporates one or more server-side plugins, wherein each plugin is associated with a plugin definition and the plugin definition associated with a server-side plugin is configured to be imported by a client computer, and the importation of the server-side plugin definition enables the client-side plugin to communicate with the server-side plugin.

In some embodiments, the plugin definition associated with the client-side plugin is configured to be imported by the server computer. In some embodiments, the importation of the client-side plugin definition to the server computer enables the server-side plugin to communicate with the client-side plugin.

In some embodiments, the client computer includes two client-side plugins that communicate with each other directly without intervention by the server computer.

In some embodiments, the server computer includes two server-side plugins that communicate with each other directly.

In some embodiments, the client computer is configured to receive and process user input.

In some embodiments, the virtual desktop system further includes a proxy mechanism configured to enable the client computer to communicate with the server computer. In some embodiments, the proxy mechanism intercepts messages from legacy protocols at the protocol level from server-side legacy applications and relays the messages to the client computer to support at least one of: a rendering task provided by a legacy client of said protocols; an interaction task provided by a legacy client of said protocols; an extension of the rendering and interaction beyond that provided by legacy clients of said protocols; and inter-plugin communication as part of the extension.

In some embodiments, the client-side plugin utilizes GUI functionality offered by the client computer and an operating system on the server computer lacks GUI functionality. In some embodiments, the client computer implements the GUI functionality using HTML5 and JavaScript.

In some embodiments, the client-side plugin and the server-side plugin are associated with an application executing on a server computer.

According to another aspect, embodiments relate to a method of operating a virtual desktop. The method includes installing at least one application comprising a server-side plugin on a server computer comprising a web server; autonomously deploying, by the server-side plugin, one or more client-side plugins to a client computer for installation; executing the client-side plugin on the client computer; and executing the server-side plugin on the server computer, wherein the client-side plugin and the server-side plugin interact and thereby offer an application with GUI functionality.

In some embodiments, the method further includes receiving operator input at the client computer; and processing the operator input at the client computer using the client-side plugin without the involvement of the server computer.

In some embodiments, an operating system on the server computer lacks GUI functionality.

In some embodiments, an operating system on the client computer includes GUI functionality.

According to yet another aspect, embodiments relate to a virtual desktop system. The virtual desktop system includes a client computer comprising a first client-side plugin and a second client-side plugin, wherein the first client side-plugin and the second client-side plugin are configured to interact with each other using an application programming interface and without requiring intervention by a server computer.

In some embodiments, the first client-side plugin is configured to communicate with a server-side plugin on a server computer.

In some embodiments, the system further includes a plugin-management system that enables third-party vendors to provide new plugins for installation by a user of the system. In some embodiments, the plugins provided by third-party vendors can have interactions with plugins from any vendor subject to security restrictions controlled by an administrator. In some embodiments, the third party vendors register their own extensions to the legacy protocol plugins discussed above.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
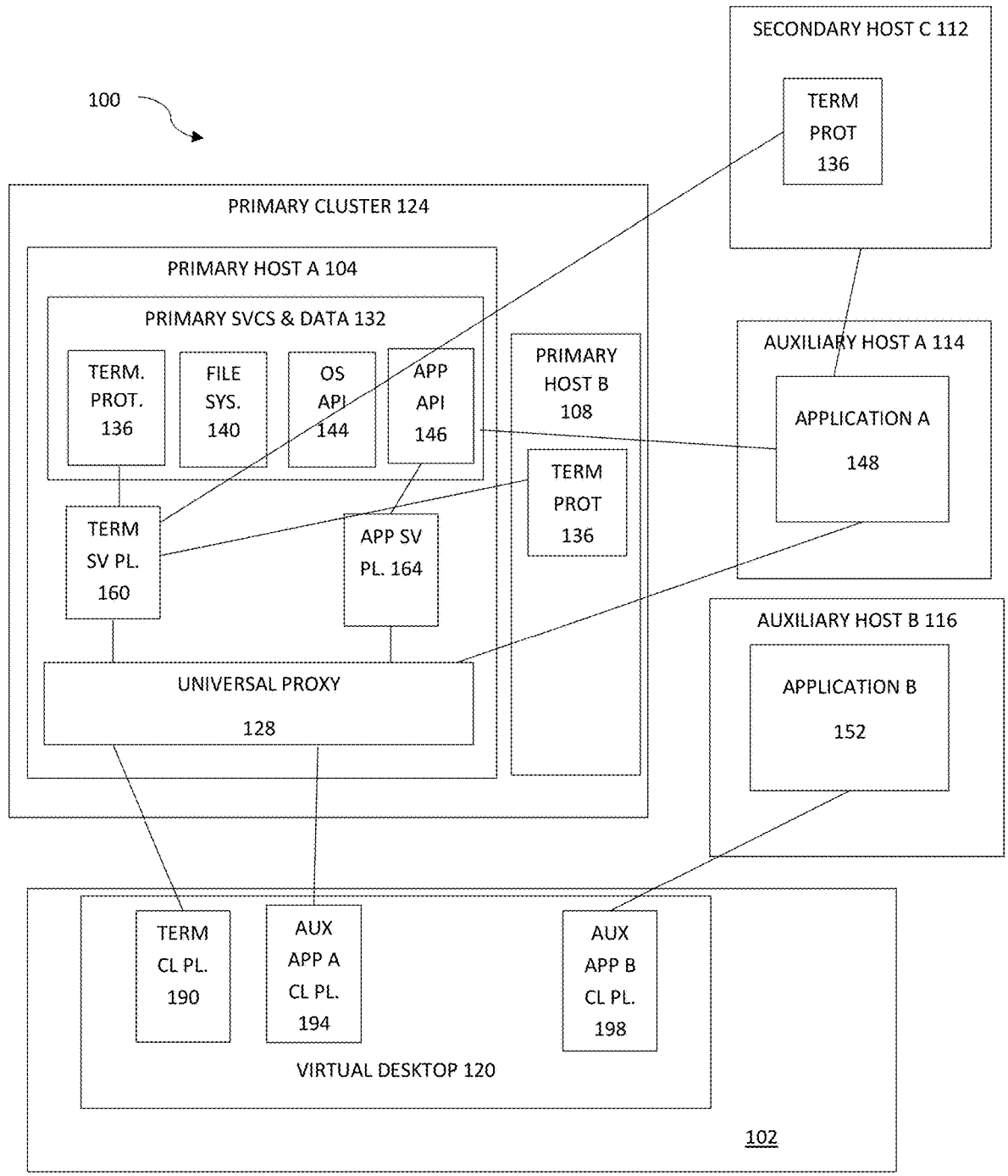
FIG. 1 illustrates a system for presenting a virtual desktop in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments of systems and methods described herein overcome the disadvantages of the prior art by offering a proxy mechanism that makes it possible to provide a graphical user interface that gives the user a "desktop experience" on operating systems that do not include a library of graphics primitives (graphics API) that can be rendered on the host operating system. For example, operations executing on a legacy computing system lacking a GUI have their communications (e.g., TELNET, TN3270 messages) intercepted at the protocol level and directed to and from a client computer having a GUI for display using graphics libraries available on the client computer. In one embodiment, the client computer implements the GUI in a web browser using, e.g., HTML5 and JavaScript technology. This embodiment has the advantage that the same "graphics libraries" are available on a wide variety of client computers, allowing the same rendering code to be executed on multiple systems.

Embodiments of the present invention permit application developers to equip legacy and mainframe applications with GUI functionality by developing a client side component with GUI functionality that interacts with a server side component lacking GUI functionality through the aforementioned proxy.

In accordance with the systems and methods described herein, the UI rendering, and user input handling is all done locally on the client computer, with state and content changes being transmitted to a proxy only as necessary. This should, in general, provide a more responsive user experience, especially in the presence of flow network bandwidth. This configuration also consumes fewer resources on a primary host and allows for a larger number of users than the typical remote desktop architecture.

Again, in contrast to other remote desktop configurations, embodiments of systems and methods described herein permit administrators to have greater control over application execution and installation by users. This is, in part, due to the leveraging of server-side authentication mechanisms available in a mainframe environment that are typically absent from a desktop-oriented operating system.

FIG. 1 depicts a system 100 for presenting a virtual desktop in accordance with one embodiment. A client computer 102 may execute an operating system with a native, windowed GUI for user interaction and management, such as MICROSOFT WINDOWS®, OS X®, etc. Host computers 104, 108, 112, by contrast, execute non-desktop operating systems, i.e. operating systems whose primary means of interaction with users is through character-based terminals, such as IBM® zOS, VM/CMS, AIX®, etc.

Client computer 102 may execute a virtual desktop 120 that presents a GUI conforming to the well-known desktop metaphor, with various icons in the GUI associated with services and programs executing on one of the host computers 104-116. The virtual desktop 120 may be an executable program or a compiled or interpreted application running inside another executable program, such as a web browser.

The virtual desktop 120 may be modular in nature, allowing the addition of additional modules called plugins to access various applications executing on a host computer 104-116 and to provide associated user interface elements in the virtual desktop 120. A plugin is declared to the universal proxy 128 by way of a plugin definition. The plugin definition can declare a set of data services, each of which consist of a URL pattern and a supporting implementation.

In addition to the data services, a plugin definition can also declare a client plugin application (e.g. Terminal client plugin 190).

When the proxy 128 receives a web service request from a virtual desktop client plugin (e.g., terminal client plugin 190), the proxy 128 dispatches the request to the corresponding server plugin. For example, as various applications are executed on a host, a proxy 128 (discussed below) operates to intercept messages at the protocol level from the application and relay those intercepted messages to the virtual desktop 120. A module may be implemented to receive those particular messages and provide them in a graphical and user-friendly way to an operator. For example, one module may simply present messages from a terminal application in a framed window. Another module may present messages from a configuration application as a graphical window with multiple interactive user interface elements to permit an operation to change the settings of one or more of the host computers 104-116.

Primary hosts 104, 108 run TCP/IP services and programs that are represented as icons in the virtual desktop 120. The primary hosts 104, 108 may be organized in primary cluster 124 so as to share storage resources, storage configurations, and to run scaled clustered applications such as large application and web servers as is known to one of ordinary skill.

Auxiliary hosts 114, 116 are computers that are not part of the primary cluster 124 but still execute auxiliary applications such as those that provide access to the primary hosts 104 and 108. Typically, these hosts 104 and 108 may perform tasks such as, but not limited to, aiding in the management and monitoring of the primary cluster 124. The auxiliary hosts 114, 116 may execute either desktop or non-desktop operating systems.

At least one of the primary hosts 104, 108 in the cluster 124 (here, primary host A 104) executes a universal proxy 128. In one embodiment, the universal proxy 128 is a modified web server that serves one or more functions. In some embodiments, the proxy 128 intermediates between the client plugins executing within the virtual desktop 120 and the services and data layer 132 on one or more of the server computers 104-116.

Figure 2:
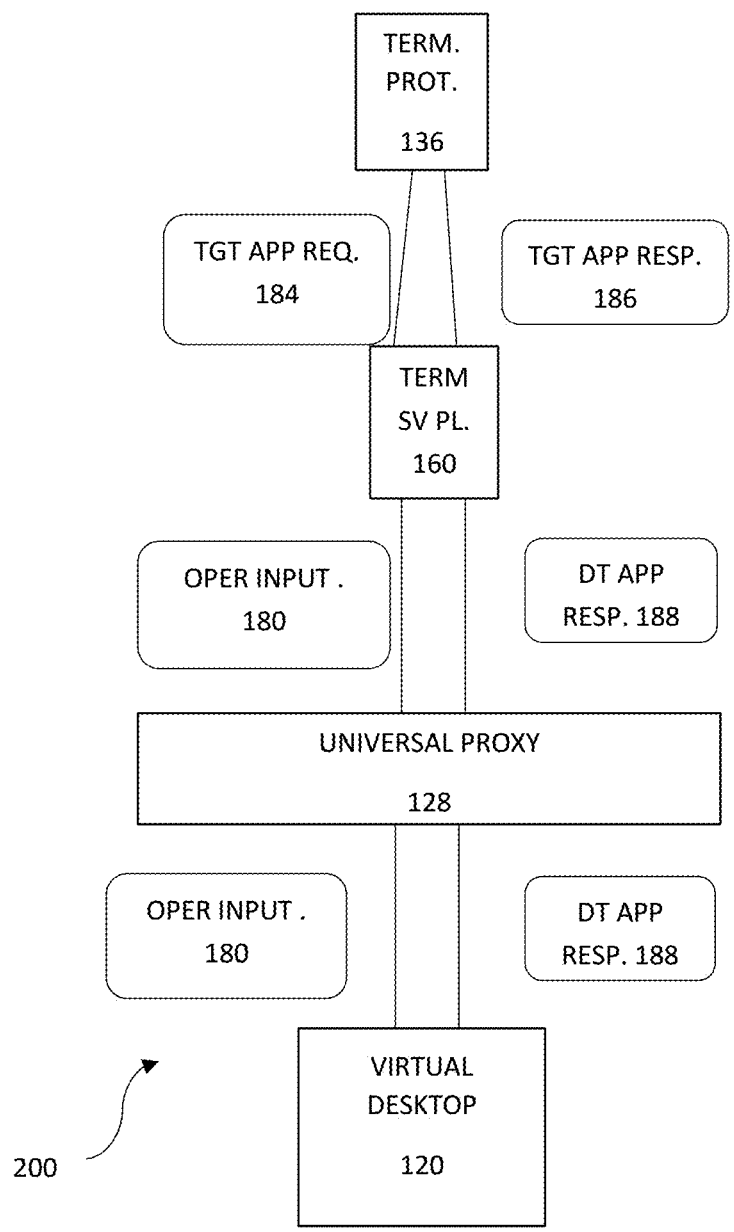
FIG. 2 illustrates the workflow of the universal proxy of FIG. 1 in accordance with one embodiment.

FIG. 2 illustrates a workflow 200 regarding how the proxy functions. The proxy 128 is a two-way proxy and receives operator input from the virtual desktop 120 via http/https and then, based on the details of that call, chooses a server plugin, e.g. TERM SV. PL. 160, and passes the operator input 180 to the server plugin 160. The server plugin 160 reads the operator input 180 and produces a target application request 184 and sends it to the appropriate target application (e.g. TERM PROT. 136) in the protocol specific to that application that is executing on the services and data layer 132 (e.g., the TN3270 protocol).

The server plugin 160 then receives target application results 186 from the target application 136 and translates those results into a virtual desktop response 188 to be returned to the virtual desktop 120 via the proxy 128. The use of server plugins enables the proxy 128 to be extended to be a proxy for any number of different applications using any number of different protocols.

In some embodiments, the proxy 128 also operates to provide secure proxied access to the services and data layer 132, as discussed in greater detail below. As illustrated in FIG. 1, the proxy 128 is not always necessary to offer the functionality discussed above. A client plugin 198 may be written to communicate directly with an auxiliary application 152, thereby avoiding the need to communicate through the proxy 128. In still other embodiments, a client plugin may be written to communicate through the proxy 128 to an auxiliary application 148 running on a host outside the cluster or a host in the cluster not running the proxy.

The auxiliary application 148, 152 may or may not need to contain any code that is specific to its participation as a target for a client-side plugin 194, 198 running in the virtual desktop 120. In other words, it is possible that interaction with some existing auxiliary applications may be included in the virtual desktop 120 without requiring modification to that auxiliary application.

Embodiments of the systems and methods described herein also include a variety of security features to address issues concerning the security of information and communications and authentication. For example, secure protocols (e.g., HTTPS) may be used to serve the static resources (e.g. html, css, javascript, etc) of the desktop application 120 from the proxy 128, to load web applications 148, 152 from auxiliary hosts 112, 116, and to otherwise secure communications among various components.

Web services that use secure protocols (e.g., HTTPS) may be used for non-static data, particularly data to be consumed by JavaScript programs running in web applications 148, 152, etc. Communication between the proxy 128 and server-side plugins 160, 164 may generally be "in memory." Communication between server plugins 160, 164 and target applications 136, 146 can take a variety of forms (in memory, network, etc.), and the security of that conversation is the responsibility of the implementation of the server plugin 160, 164, and not the responsibility of the proxy 128.

Generally speaking, the access of different resources executing on one or more computers through a single virtual desktop implicitly requires some mechanism to address user authentication for each of the resources. Some implementations, such as credential caching, may be insecure and present a single point for attack by third parties seeking to compromise a system and its resources.

Embodiments of the systems and methods described herein permit the user to sign on once through the virtual desktop application 120. Once authenticated, the universal proxy 128 or another security component (not shown) handles the subsequent authentication of the various individual resources offered through the virtual desktop application 120.

Generally speaking, the component of the systems described herein offering this single sign-on functionality utilizes the native authentication functionality of each resource (e.g., 132-152) to control access to the resource. In some embodiments, the authentication server (not shown) creates short-term-leased cryptographically secure tokens (sometimes called tickets) that grant a secondary means of authentication to cooperating servers and services.

Features of systems and methods described herein also provide for a reduced sign-on implementation. The proxy 128 and desktop 120 incorporate multiple server plugins (160, 164, et. al) and client plugins (190, 194, et. al) that can communicate with many target applications 136, 146, 148, et. al.

In one embodiment, the relationship between the proxy 128 and each server plugin depends on the plugin. One "relationship" is that the proxy 128 loads the server plugin as a "dynamic library" (like a DLL). The type of "relationship" is declared in the plugin definition, and the types of relationships can be extended.

The target applications can be in different types of security domains, and have different authentication requirements. The same target application can have different authentication requirements at different customer sites. The types of security domain implementations can include, but are not limited to: primary server native authentication (e.g., SAF on the mainframe), LDAP, Kerberos, and "target application-specific". The authentication requirements can include, but are not limited to: username/password, username/one-time token (e.g. SecurID), and multifactor authentication.

The virtual desktop environment should include security facilities that provide for the most highly reduced sign-on (RSO) that is practical at any given installation. In one embodiment, this entails a client master security manager and a server master security manager that work with client security plugins and server security plug-ins to provide the greatest practical end-user convenience without placing undue burden on the security administrator, and without compromising the security of the target applications.

A security plugin is a set of software modules that acts as a broker between the proxy security manager and the security domain implementation instance. Each "plugin instance" is configured by the proxy administrator to belong to a specific security domain. Each security domain is configured, also by the proxy administrator, to be managed by a security domain plug-in instance. Note that the proxy 128 has built-in security plugins to satisfy the security needs of target applications running in the primary cluster and uses the native authentication or another mechanism (e.g. SAF on the mainframe), which is referred to as the primary security domain implementation.

The security for target applications running in the primary security domain implementation will generally require little or no configuration by the proxy administrator. The following discussion is concerned mostly with examples of target applications running security domains other than the primary security domain implementation and using a variety of authentication mechanisms.

Figure 3:
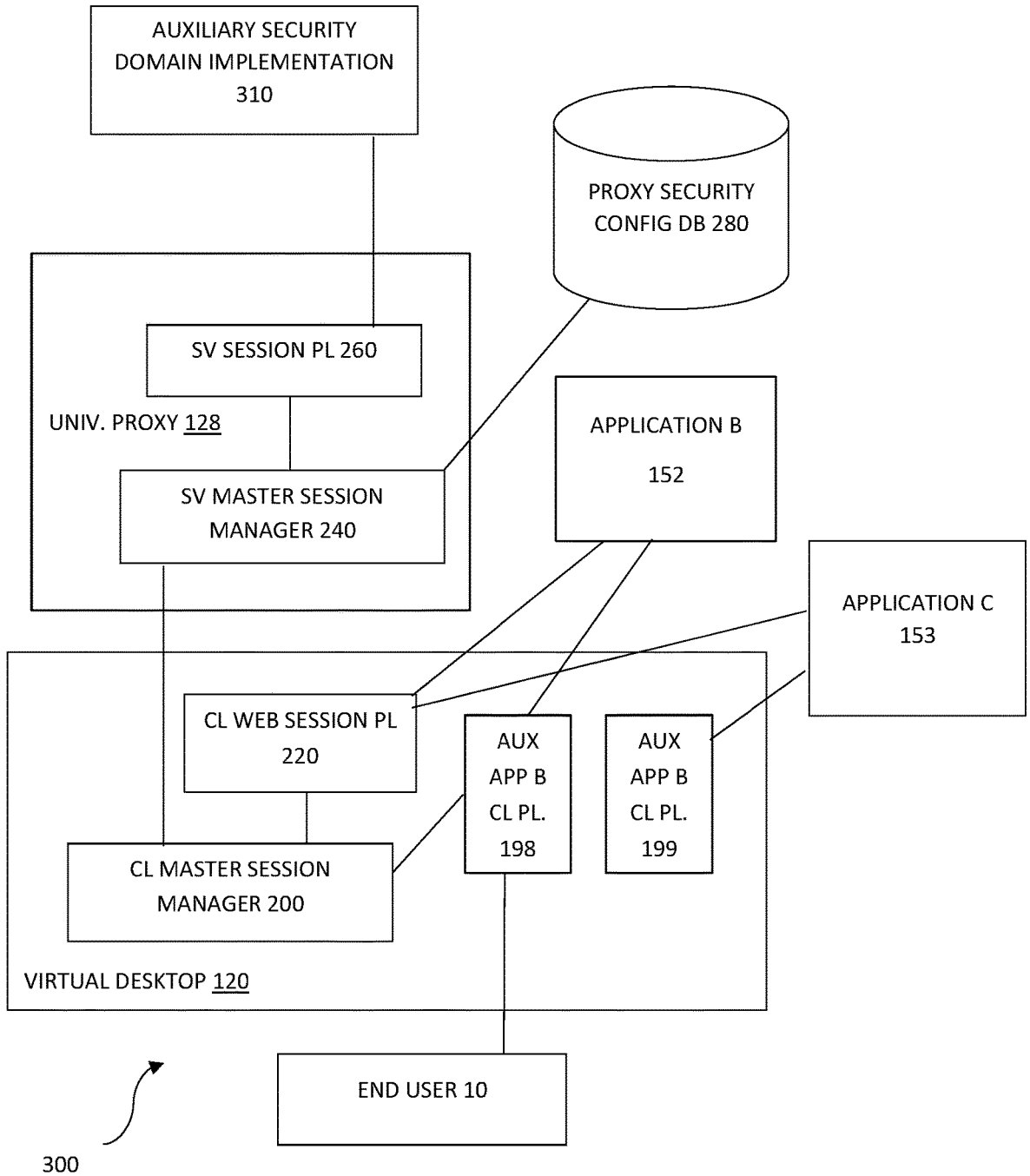
FIG. 3 illustrates components participating in a security negotiation in accordance with one embodiment.

FIG. 3 illustrates a system 300 of the main participating objects in security negotiations. However, not all negotiations will require all participants. The below discussion, in conjunction with FIG. 3, outlines the components and steps involved in an exemplary security negotiation.

First, an end user 10 may launch a client plugin 198 on the virtual desktop 120. Then the virtual desktop 120 may check with a client master session manager 200 to determine if the client plugin 198 already has a currently active negotiated session with the target application 152. In this particular example, the client plugin 198 does not have a negotiated session.

The client master session manager 200 may then check with the master server session manager 240 (using the proxy 128) to determine if the server session manager 240 already has a currently active negotiated session for the end user 10 with the appropriate auxiliary security domain implementation 310. The master server session manager 240 may consult with the proxy security configuration database 280 to find out which security domain and associated server session plugin is required by the client plugin 198 and checks if the end user 10 has the session with the specific security domain. In this example, the security domain is auxiliary security domain implementation 310 and the associated session plugin required is plugin 260.

In FIG. 3, the end user 10 does not have an active negotiated session with the auxiliary security domain implementation 310. It is noted that the association between the client plugin 198 and the auxiliary security domain implementation 310 is typically configured previously by the proxy administrator.

The server session manager 240 may find out from the server session plugin 260 what kinds of credentials are required, and finds out from the proxy security configuration database 280 which client session plug-in should be used to obtain those credentials (in this example client session plug-in 220). The server session manager 240 may respond to the client session manager 200 with the information that the virtual desktop 120 may use with the client session plugin 220 to obtain those credentials.

The client session plugin 220 may prompt the end user 10 to provide the necessary credentials (as specified above), and sends the received credentials to the proxy 128. The proxy 128 may dispatch them to the master server session manager 240, which may then dispatch them to the server session plugin 260. The server session plugin 260 negotiates with the auxiliary security domain implementation 310 to establish a session.

The server session 260 uses the established session to obtain a one-time use token which is returned to the client session plug-in 220. All sensitive information relating to the established session may be protected using the best available security facilities on the primary host 104, such as the Integrated Cryptographic Service Facility (ICSF) on z/OS.

The client session plugin 220 may use the one-time use credentials to obtain a session token from the auxiliary application 152, which is made available to the client plugin 198 so the client plugin 198 can communicate with application 152.

In some embodiments, if the end user 10 uses the client plugin 199 and the client plugin 198 uses the same auxiliary security domain 300, the session negotiation with auxiliary application C 153 can be completed without prompting the user 10 for further credentials. The processes outlined above allows the proxy 128 to be extended to handle a wide variety of security domain implementations and auxiliary application session negotiations.

The use of master client and server session managers hide the variety of session plugin implementations from the client plugins. For many target application security requirements, some of the steps outlined above may be eliminated. Not all session plugins need to participate, for example, if the target application is in the same security domain as the primary host. In particular, when the target application is in the same security domain as the primary host, the initial credentials provided when the user 10 logged into the virtual desktop 120 are sufficient to establish sessions with the target application (for example via credential replay, one-time use tokens obtained from the primary session, or by impersonation).

Figure 4:
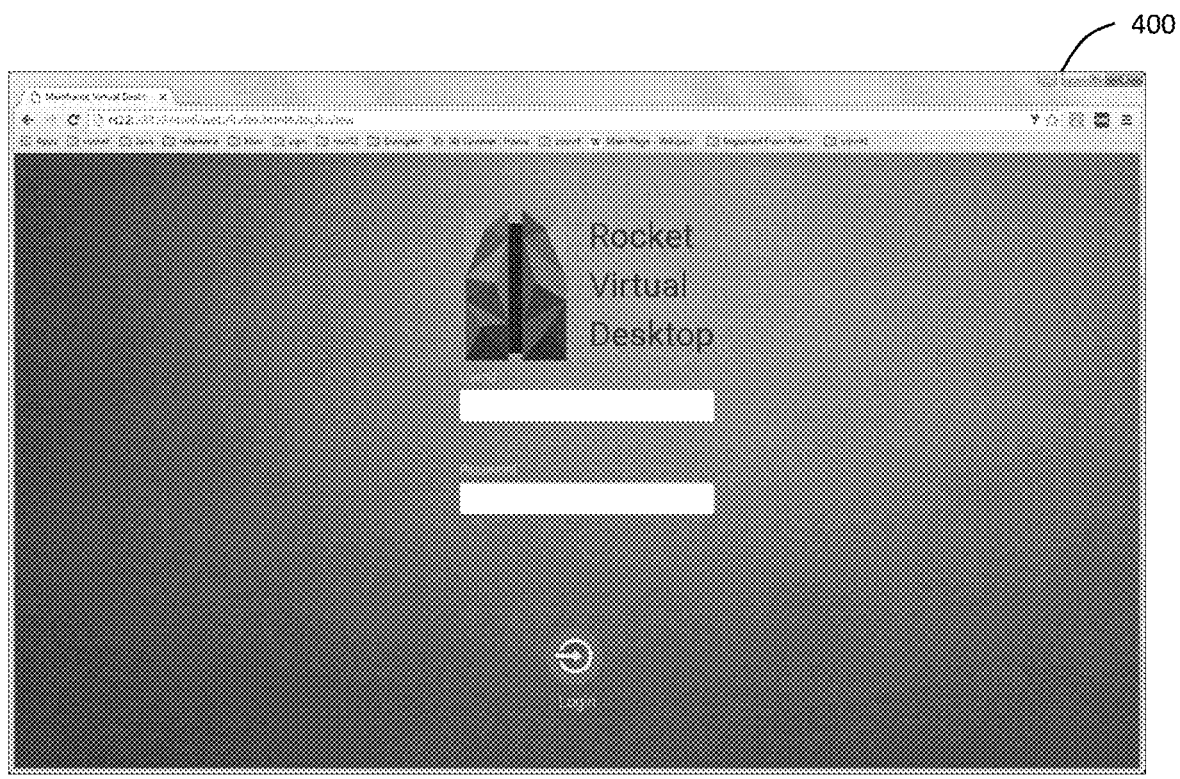
FIG. 4 presents a screenshot of a sign-on page to the virtual desktop in accordance with one embodiment.
Figure 5:
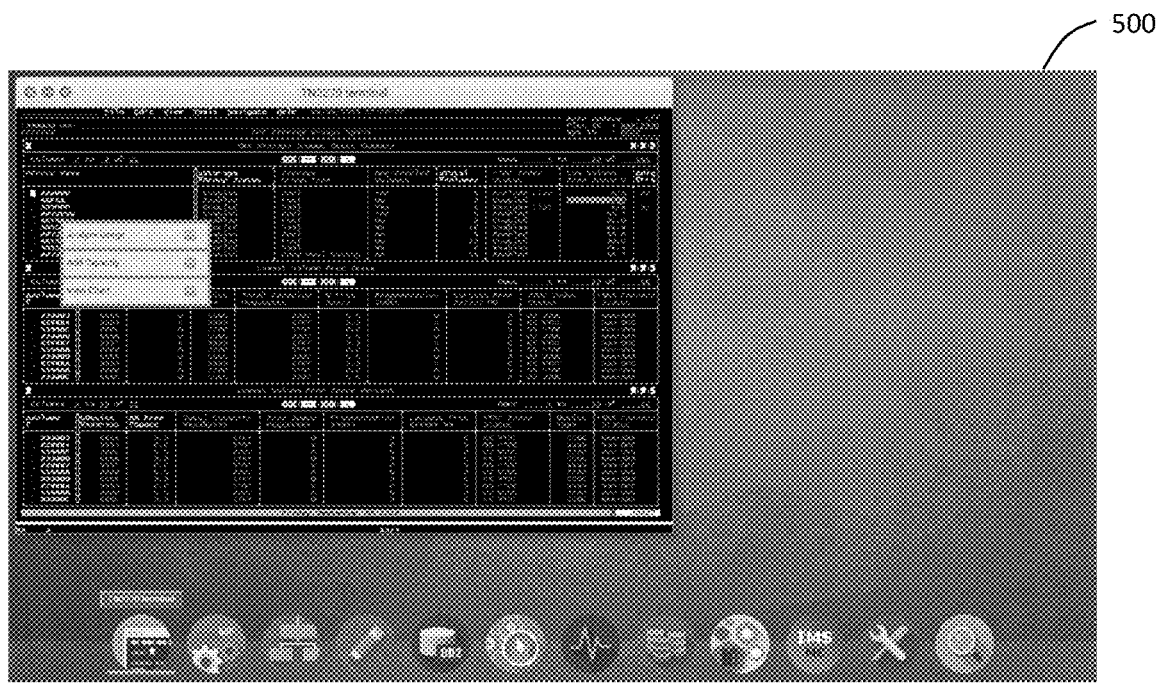
FIG. 5 presents a screenshot of a graphical user interface (GUI) of the virtual desktop in accordance with one embodiment.

FIGS. 4 and 5 are exemplary screenshots of the virtual desktop sign in page 400 and one embodiment of a GUI 500 offered by the virtual desktop 120 in accordance with one embodiment. The end user's experience of the virtual desktop 120 is similar to the experience of using a remote desktop. First the user logs in using the sign in page 400 of FIG. 4.

In one embodiment, "logging in" entails the user entering the URL of the proxy 128 into their web browser, at which point the login page is rendered in the user's browser. The user may then enter their credentials and submit them to the proxy. In this embodiment, the user's browser is now directed to a desktop page.

Once on the desktop page, the end user can launch applications (i.e., plugins). In one embodiment, "launching an application" entails clicking on a "launch icon." The launch icon may be an icon visible on the main desktop page, or the launch icon may be found in a menu, or in the results of a search. Like other desktops, the set of visible icons on the main desktop page is configurable by the user (see below about end user configurations).

For most client plugins, clicking on the launch icon will result in the creation of a window. The border of the window is drawn and controlled by the window manager of the desktop application. The content of the window is drawn and controlled by the client plugin. Like windows in existing windowing systems (such as WINDOWS® and OS X®), the user can minimize, maximize, drag, resize, and close windows. In cases where the client plugin is associated with the primary security domain, the end user will not need to present credentials to launch and interact with the client plugin.

The customizations that the user can make to their virtual desktop (including, but not limited to selecting which launch icons are visible on their desktop, and where those icons are placed) are stored by the proxy 128 in such a way that, regardless of what browser or client system the user uses to connect to the proxy, their preferences will be retained. As will be explained below, the configurations and preferences of a user's desktop experience can be administered both centrally by the proxy administrator and by the end user in ways that are distinct from existing desktops.

Many operating systems, including z/OS, allow several computers to be grouped together as a "cluster." The resource sharing, load-balancing, and failover capabilities provided by clustering allow the grouped computers to appear to some applications as one larger, faster, and more reliable computer. The virtual desktop 120 may provide a single desktop experience to the entire cluster and not just an individual system in the cluster.

It is also possible to run multiple instances of the proxy 128 from one installation. The proxy administrator can create/edit configurations (called site configurations) that apply to all instances, and the proxy administrator can create/edit configurations (called instance configurations) that apply to specific instances.

In any given instance, an end user can create/edit preferences (called user preferences) that apply to their specific login, and that, in some cases, may override the configurations created/edited by the proxy administrator. A proxy administrator can configure, at the site or instance level, which plugins are available to which users, and what the initial set of launch icons will be for which users.

The virtual desktop 120 provides an infrastructure that allows one client plugin (the source client plug-in) to launch a different client plugin (the target client plugin) in a way that puts the target client plugin in a context specified by the source client plugin. In a general sense, this infrastructure provides a user experience that is similar to that found in existing desktops such as MICROSOFT WINDOWS® and OS X®.

For most target client plugins that address target applications in the primary security domain, including the terminal applications, the end user will not need to reenter their credentials. This single sign-on experience is often taken for granted by users of existing desktops such as MICROSOFT WINDOWS® and OS X®.

For example, when launching a power shell in Windows, the user does not need to reenter their credentials. The same is true in the virtual desktop, which is new for users of non-desktop operating systems such as z/OS. The user of the virtual desktop will not need to reenter credentials for terminals, whether the user is explicitly launching the terminal application or whether the terminal application is launched by some other plugin. In one embodiment of the virtual desktop, the inter plugin launching capability is the responsibility of the launch dispatcher. A client plug-in can interact with the launch dispatcher by declaring itself as a launch provider, by requesting which "launches" are available; and by executing a launch.

The plugin definition loaded in the proxy 128 can contain a list of launch declarations. Each launch declaration can contain one or more of the following items:

(1) The identifier of the launch. This identifier is typically unique within a given plugin definition.

(2) A declaration of the context to which this launch can apply. This includes, but is not limited to, a list of the types of elements (e.g., a disk or a network interface card).

(3) The generic name of the action (e.g., "deleteElement").

(4) Information related to the launch so that it can be included in such places as a toolbar or a menu. This can include, but is not limited to, an icon and/or a label.

The proxy administrator can control the applicability of launches. The default is that all declared launches are available to be executed from all plugins, but the proxy administrator can control which launches can be executed from which plugins.

End users can, in addition, control what subset of launches are active in their own virtual desktop (assuming the launches are allowed by the administrator). The proxy administrator can also choose which is the default launch for a given combination of type and action name. It is also possible to add additional launch declarations (outside of plugin definitions) at the site, instance, and user level.

An end user or administrator can also control which plugins are visible and what interactions can be executed between those plugins. For example, it is possible to do so from proxy instance to proxy instance, and from user to user. This makes it possible to create specific desktops for specific purposes, such as a storage administrator desktop, a database application developer desktop.

Cross plugin launch capability can be added to a plugin in a variety of ways. For example, cross plugin launch capability can be added to a plugin by hardcoded launches to specific other plugins or by retrieving a list of declared launches that apply to a specific context. The options may then be presented to the user. The types of presentation used are at the discretion of the plugin and can include, but are not limited to, context menu items, general menu items, toolbar icons.

One specific type of plugin is referred to as a terminal plugin. A terminal plugin gives the end user access to a large number of terminal-based applications on the primary host.

There are several ways that terminal-based applications can be integrated into the virtual desktop. These include, but are not limited to the ability to associate terminal extension plugins that can be declared to become active when the terminal enters specific contexts.

In one embodiment, the TN3270 terminal plugin "specific contexts" can be recognized because many terminal-based applications mark their contexts or "panels" with an identifier, or "panel ID" that is unique within a global namespace. The terminal extension plugin can parse or "screen scrape" the contents of a specific panel in order to recognize the types of elements represented on that panel. The extension plugin can use this information to have a meaningful interaction with the launch dispatcher. Although this can occur without any need to modify the existing terminal-based application that was accessed through the TN3270 terminal plugin.

Features of various embodiments also allow for various sub-applications (i.e., plugins) to be installed on a server side computer. This allows for a number of advantages such as providing additional UI functionality on a client computer and providing additional server-side functionality and access to data sources.

Additionally the client UI of a plugin can interact with the client UI of other plugins on the client side at an API level. These client UIs can also access the functionality of the plugin's own server-side functionality or data services (e.g., Representational State Transfer services), as well as access the server-side functionality or data services of other plugins.

Many non-desktop operating systems run software that is difficult to install and configure. In one embodiment of the virtual desktop, there may be plugins whose purpose is to provide a simplified and modernized user interface for installing and configuring such software. These plugins will take advantage of, where applicable, any available workflow management system that can be accessed by a plugin, to aid in the simplification of the installation and configuration processes. However, use of available and accessible workflow management systems is not limited to plugins whose purpose is to provide a simplified and modernized user interface for installing and configuring other software on the non-desktop operating system.

For example, in one embodiment, the proxy 128 may include infrastructure that discovers key sets of software already installed on the non-desktop operating system, and may provide interfaces that allow plugins to access that information. The purpose of this infrastructure is to provide immediate value with minimal configuration for those users that wish to manage those key sets of software.

Figure 6:
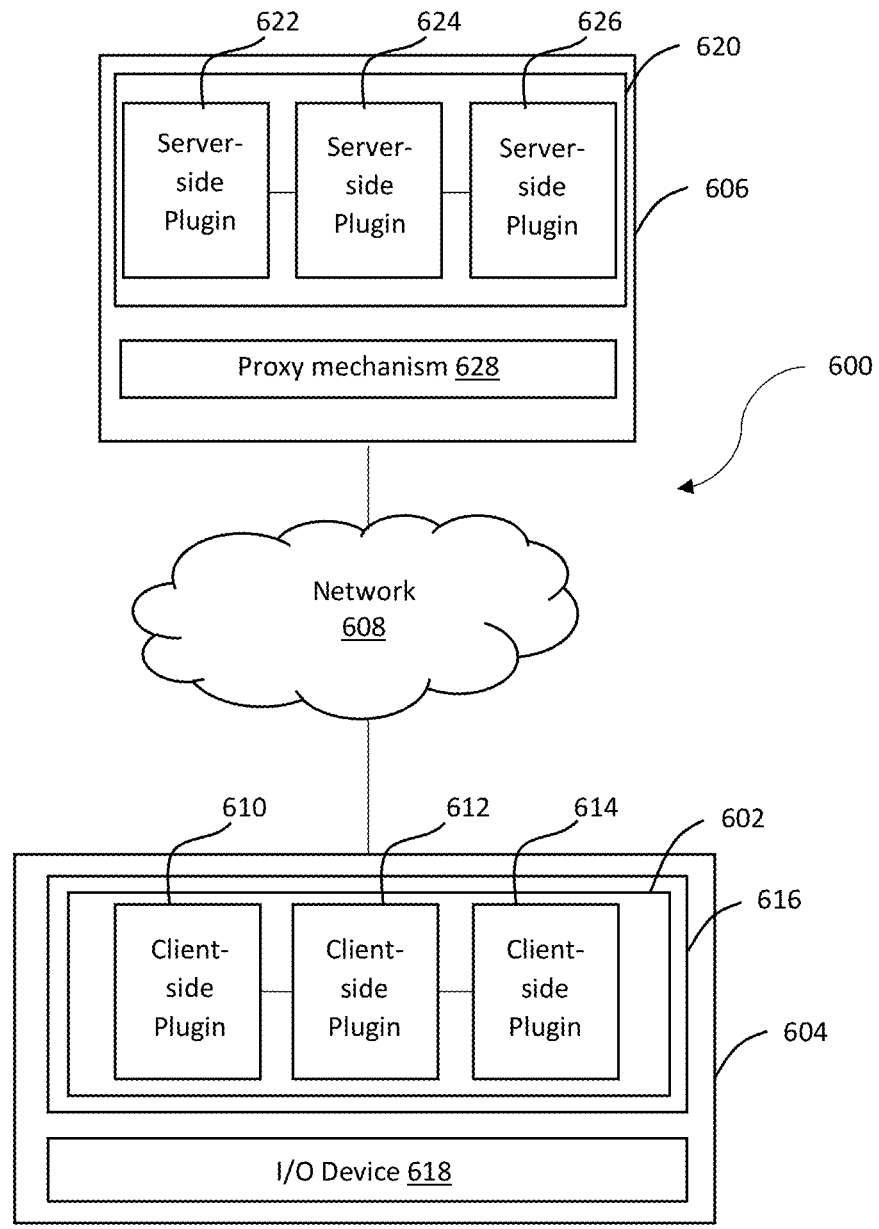
FIG. 6 illustrates a system for presenting a virtual desktop in accordance with another embodiment.

FIG. 6 illustrates a system 600 for presenting a virtual desktop 602 in accordance with one embodiment. The virtual desktop 602 may be similar to the virtual desktop 120 of FIGS. 1 and 3. The virtual desktop 602 may execute on a client computer 604 and may be in communication with a server computer 606 over one or more networks 608. In the context of the present application, the client and server computers 604 and 606, respectively, may be any physical computer, virtual computer, or other type of computing appliance running an operating system with a web server that may interact with a plugin.

The network or networks 608 may link the various devices with various types of network connections. The network(s) 608 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 608 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The virtual desktop 602 may include one or more client-side plugins 610-614, and may run inside another executable program 616, such as a web browser. The client computer 604 may further include one or more input/output (I/O) devices 618. The server computer 606 may include a web server 620 that incorporates server-side plugins 622-626 and a proxy mechanism 628 to facilitate communication between various components of the system 600.

The virtual desktop 602 may be modular in nature and allow the addition of plugins 610, 612, and 614 that can access various plugins executing on the server computer 606 (e.g., server-side plugins 622-626). Together, the server-side and client-side plugins can operate to provide to a user an application having the graphical functionality of the client and, e.g., the computational resources and/or data sources of the server computer 606.

Additionally the client-side plugins 610-614 may provide associated UI elements using the I/O device 618. For example, the I/O device 618 may present the plugins 610-614 as various icons on one or more windows displayed on a computer screen.

In contrast to existing remote desktops such as those for Microsoft Windows, the UI rendering and user input handling is all done locally on the client computer 604. This provides a more responsive user experience, especially in the presence of low network bandwidth. Additionally, this configuration consumes fewer server resources and therefore allows for a larger number of users than existing remote desktop architectures.

Accordingly, systems and methods of various embodiments allow for a more "client-rich" approach. That is, the server computer 606 need not be aware of event activity occurring on the client computer 604. Instead, application logic may be delegated to the client computer 604.

Specifically, the architecture and implementation of the various server-side and client-side plugins together may determine how much application logic is performed on the server computer 606 and how much is performed on the client computer 604. The application logic may initially be stored on the server computer 606 and retrieved by a program 616 for rendering such as a web browser.

Each plugin may be associated with a plugin definition. The plugin definition can include the definitions of server-side data services, each of which consist of a URL pattern and a supporting implementation. In addition to the data services, a plugin definition can include the definition of a client-side plugin.

In some embodiments, a pluginDefinition tells the client and server computers 604 and 606, respectively, how to load the plugin(s). Additionally, the pluginDefinition declares the access points that allow other plugins to call this plugin, both on the server (i.e., for server-to-server calls and client-to-server calls) and the client (i.e., for client-to-client calls).

Additionally or alternatively, the plugin definition associated with a client-side plugin (e.g., plugin 610) is configured to be imported by a plugin on the server computer 606. This importation of the client-side plugin 610 definition enables a client-side plugin (e.g., plugin 610) to communicate with the server-side plugin 622. Additionally or alternatively, client-side plugin 610 and client-side plugin 612 may communicate with each other directly and without requiring intervention by the server computer 606 or a server-side plugin. Similarly, server-side plugin 622 and server-side plugin 624 may communicate with each other directly.

In some embodiments, the proxy mechanism 628 may be configured to enable a client-side plugin to communicate with a server-side plugin. For example, the proxy mechanism 628 may intercept messages or commands from the server-side plugin 622 at the protocol level and relay the messages or commands to the client-side plugin 610.

The proxy mechanism 628 may also intercept messages using legacy protocols (e.g., Telnet, TN3270, ssh, etc.) at the protocol level from server-side legacy applications. The proxy mechanism 628 may then relay these messages to the client computer 604 to support a variety of tasks. For example, the proxy mechanism 628 may support traditional rendering and interaction tasks provided by legacy clients of the applicable protocols, extend the rendering and interactions beyond that provided by legacy clients of the protocols, and enable inter-plugin communication as part of the extensions mentioned above.

Figure 7:
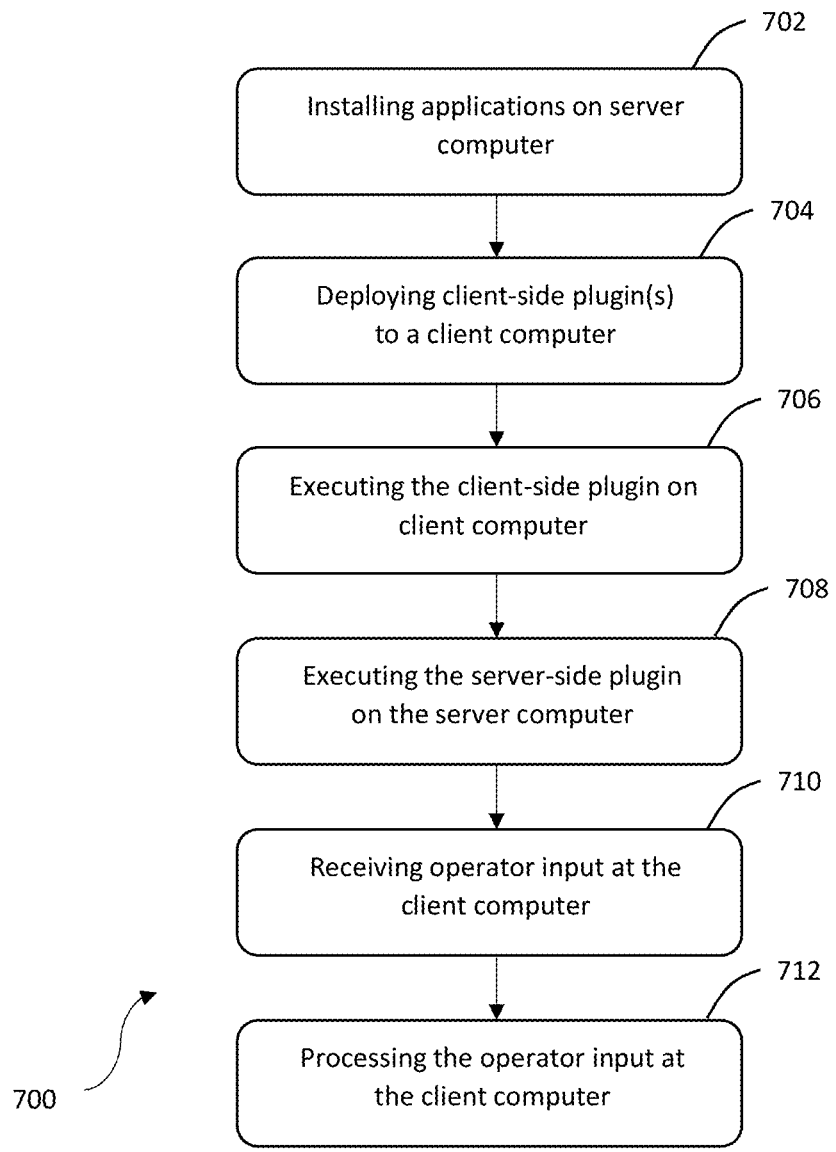
FIG. 7 depicts a flowchart of a method of operating the virtual desktop of FIG. 6 in accordance with one embodiment.

FIG. 7 depicts a flowchart of a method 700 of operating a virtual desktop in accordance with one embodiment. The virtual desktop may be similar to the virtual desktop 120 of FIGS. 1 and 3 or the virtual desktop 602 of FIG. 6, for example.

Step 702 involves installing at least one application comprising a server-side plugin on a server computer comprising a web server. This plugin may be similar to plugins 622-626 of FIG. 6, for example, and the server computer may be similar to the server computer 606.

The system 600 may be in communication with a plugin marketplace feature that enables users to select plugins to install from a set of available plugins in one or more marketplaces. The use of multiple marketplaces allows, for example, an administrator or authorized user to set up internal marketplaces that contain only preapproved sets of plugins which may include internally developed plugins.

An administrator may have control over end-user access to these marketplaces. The administrator may, for example, control which users can see which marketplaces and which plugins users can see within those marketplaces. This type of control can include, but is not limited to, allowing only plugins from a specific set of vendors to be visible while plugins from other vendors may not be visible.

The plugin marketplaces may include published API's that allow the third party vendors to write and ship new plugins for installation by a user. The third-party vendors are also able to register their own extensions to existing legacy protocol plugins.

Step 704 involves autonomously deploying, by the server-side plugin, a client-side plugin to a client computer for installation. This client-side plugin may be similar to client-side plugin 610 (or a plugin of FIG. 1 or 3) and the client computer may be similar to the client computer 604 of FIG. 6. Accordingly, an end user does not need to perform any installation actions on the client computer 604. This aspect may be achieved by using a program such as the program 616 of FIG. 6 as the engine for rendering a client user interface to facilitate installation. In some embodiments, the program 616 may be a web browser.

Step 706 involves executing the client-side plugin on the client computer. The client-side plugin may, for example, receive user input such as instructions or commands related to an application associated with both of the client and server-side plugins.

Step 708 involves executing the server-side plugin on the server computer. The client-side plugin and the server-side plugin may interact to, for example, offer an application with GUI functionality. The GUI functionality may be implemented in HTML5 and JavaScript, for example. Accordingly, GUI functionality may be extended to a server side computer operating system that lacks GUI functionality.

Step 710 involves receiving operator input at the client computer. An operator may enter commands or instructions using an I/O device 618 such as a touch screen, a stylus, a keyboard, a mouse-cursor, or the like.

Step 712 involves processing the operator input at the client computer using the client-side plugin without the involvement of the server computer. That is, the operator input is not necessarily communicated to the server 106 for processing. Rather, the client computer 604 is "client-rich" in that all required processing may be performed thereon. As stated previously, this provides a more responsive user experience (especially in the presence of low network bandwidth) and consumes fewer network resources.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A virtual desktop system, the system comprising:
a client computer comprising one or more client-side plugins visible in a desktop configuration and accessible by a user;
a server computer comprising a web server that incorporates one or more server-side plugins, wherein each plugin is associated with a plugin definition that specifies how the plugin is to be loaded and specifies access points that allow the plugin to be accessed, and the one or more server-side plugins specify required credentials and which client-side plugin should be used to obtain the required credentials, and
a proxy mechanism to enable the client computer to communicate with the server computer, wherein the proxy mechanism intercepts messages from legacy protocols at the protocol level from server-side legacy applications and relays the messages to the client computer to support a rendering task provided by a client of said legacy protocols; an interaction task provided by a client of said legacy protocols; an extension of the rendering and interaction beyond that provided by a client of said legacy protocols; or inter-plugin communication as part of the extension,
wherein the plugin definition associated with the one or more client-side plugins includes a URL embedding an external website to extend functionality of the client computer by accessing a service associated with the server computer using a launch declaration containing an identifier that is unique to the plugin definition, and the plugin definition associated with a server-side plugin is configured to be imported by the client computer, and the importation of the server-side plugin definition enables the client-side plugin to communicate with the server-side plugin and to communicate the required credentials.

2. The system of claim 1 wherein the plugin definition associated with the client-side plugin is configured to be imported by the server computer.

3. The system of claim 2 wherein the importation of the client-side plugin definition to the server computer enables the server-side plugin to communicate with the client-side plugin.

4. The system of claim 1 wherein the client computer includes two client-side plugins that communicate with each other directly without intervention by the server computer.

5. The system of claim 1 wherein the server computer includes two server-side plugins that communicate with each other directly.

6. The system of claim 1 wherein the client computer is configured to receive and process user input.

7. The system of claim 1 wherein the client-side plugin utilizes GUI functionality offered by the client computer and an operating system on the server computer lacks GUI functionality.

8. The system of claim 7 wherein the client computer implements the GUI functionality using HTML5 and JavaScript.

9. The system of claim 1 wherein the client-side plugin and the server-side plugin are associated with an application executing on the server computer.

10. A method of operating a virtual desktop, the method comprising:
installing at least one application comprising a server-side plugin on a server computer comprising a web server;
autonomously deploying, by the server-side plugin, one or more client-side plugins to a client computer for installation, wherein the one or more client-side plugins are visible in a desktop configuration and accessible by a user and each client-side plugin is associated with a plugin definition that specifies how the plugin is to be loaded and specifies access points that allow the plugin to be accessed, wherein the one or more server-side plugins specify required credentials and which client-side plugin should be used to obtain the required credentials;
executing the client-side plugin on the client computer, wherein executing the client-side plugin includes accessing a URL embedding an external website to extend functionality of the client computer by accessing a service associated with the server computer using a launch declaration containing an identifier that is unique to the plugin definition and enabling the client-side to communicate the required credentials; and
executing the server-side plugin on the server computer, wherein the client-side plugin and the server-side plugin interact and thereby offer an application with GUI functionality, wherein the server computer and the client computer communicate through a proxy mechanism that intercepts messages from legacy protocols at the protocol level from server-side legacy applications and relays the messages to the client computer to support a rendering task provided by a client of said legacy protocols; an interaction task provided by a client of said legacy protocols; an extension of the rendering and interaction beyond that provided by clients of said legacy protocols; or inter-plugin communication as part of the extension.

11. The method of claim 10 further comprising: receiving operator input at the client computer; and processing the operator input at the client computer using the client-side plugin without the involvement of the server computer.

12. The method of claim 10 wherein an operating system on the server computer lacks GUI functionality.

13. The method of claim 10 wherein an operating system on the client computer includes GUI functionality.

14. A virtual desktop system, the system comprising:
a client computer comprising a first client-side plugin and a second client-side plugin, wherein the first client side-plugin and the second client-side plugin are configured to interact with each other using an application programming interface and without requiring intervention by a server computer, at least one of the first client-side plugin and the second client-side plugin being visible in a desktop configuration and accessible by a user, and at least one of the first client-side plugin and the second client-side plugin being associated with a plugin definition that specifies how the plugin is to be loaded and specifies access points that allow the plugin to be accessed and includes a URL embedding an external website to extend functionality of the client computer by accessing a service associated with the server computer using a launch declaration containing an identifier that is unique to the plugin definition, wherein the first client-side plugin receives data regarding required credentials from client-side plugin and is further configured to receive the required credentials from a user, wherein the server computer and the client computer communicate through a proxy mechanism that intercepts messages from legacy protocols at the protocol level from server-side legacy applications and relays the messages to the client computer to support a rendering task provided by a client of said legacy protocols; an interaction task provided by a client of said legacy protocols; an extension of the rendering and interaction beyond that provided by clients of said legacy protocols; or inter-plugin communication as part of the extension.

15. The system of claim 14 further comprising a plugin-management system that enables third-party vendors to provide new plugins for installation by a user of the system for use by the client computer.

16. The system of claim 15 wherein plugins provided by third-party vendors can have interactions with plugins from any vendor subject to security restrictions controlled by an administrator.

17. The system of claim 15 wherein third party vendors register their own extensions to legacy protocol plugins at the protocol level from server-side legacy applications for use by the client computer.

* * * * *